Jan. 25, 1966 L. T. SMITH 3,230,751
RIVETING TOOL FOR SICKLES
Filed June 8, 1964
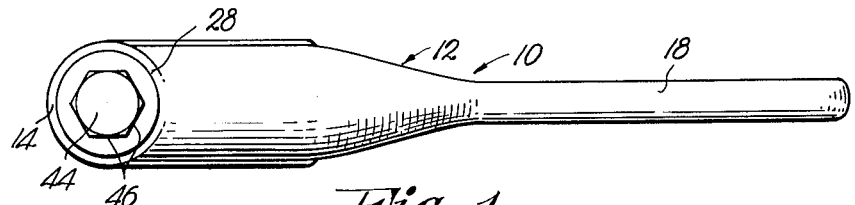
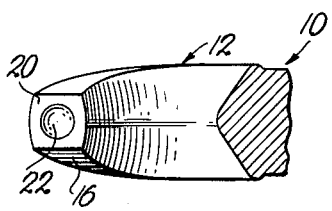
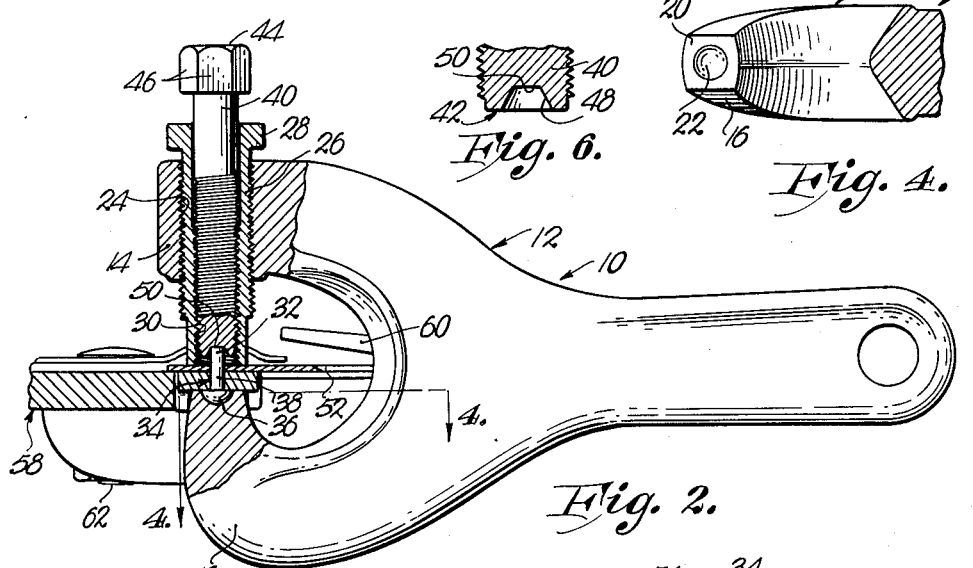
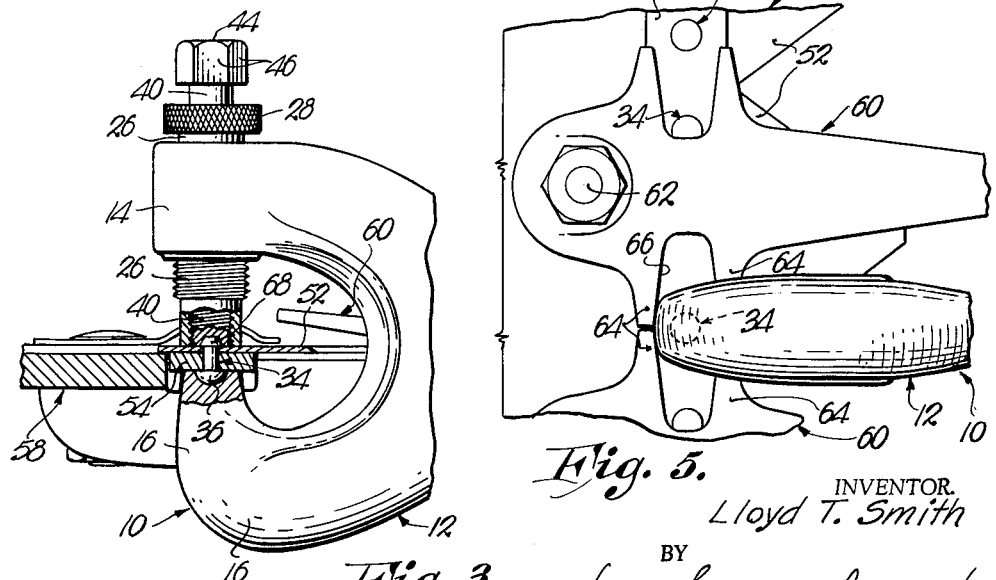
INVENTOR.
Lloyd T. Smith
BY
ATTORNEYS

United States Patent Office 3,230,751
Patented Jan. 25, 1966

3,230,751
RIVETING TOOL FOR SICKLES
Lloyd T. Smith, Newton, Kans., assignor to Rains Manufacturing Company, Inc., Harvey, Kans., a corporation of Kansas
Filed June 8, 1964, Ser. No. 373,226
3 Claims. (Cl. 72—124)

This invention relates to a hand tool adapted for the cold closing of rivet heads.

A conventional cutter bar of the type used on farm implements which gather crops, utilizes a sickle having a series of aligned sickle sections secured by rivets to and extending along a rigid strip, the latter in turn being reciprocated with respect to a plurality of spaced guards to move the sections relative to the guards and thereby mow a crop growing in advance of the cutter bar. Since the aforesaid sections are generally in close proximity to the ground as a crop is being mowed, the sections are sometimes damaged or otherwise rendered ineffective for further use, such as when the sections strike rocks or other similar objects on the ground. It then becomes necessary to replace these damaged sections so that the mowing operation may proceed in the proper manner.

Heretofore, damage to one or any number of sickle sections has necessitated the complete removal of the sickle from the cutter bar in order to replace the damaged sections with the use of conventional tools inasmuch as the rivets, which connect the sections to the strips, have had to be peened to close the same. This, in turn, has necessitated a rigid backing support such as an anvil to effect the proper closing of the rivets. It is evident that not only is a large amount of time and effort expended by the machine operator in actually replacing damaged sickle sections, but also a considerable amount of time and effort is expended merely to disassemble the sickle from the cutter bar and once again assemble it thereon after the sickle sections have been replaced.

The present invention circumvents the difficulties encountered in replacing sickle sections by conventional methods and, in this respect, this invention provides a hand tool which can close rivet heads by pressure rather than by peening. As a result, the tool may be utilized for replacing damaged sickle sections without removing the sickle from the cutter bar so as to minimize the time and effort required to place the cutter bar in condition for furtuher mowing operations.

It is, therefore, the primary object of the present invention to provide a hand tool which can be used for closing the heads of rivets which interconnect the sickle sections to the sickle of a cutter bar while the sickle remains in an operative position on the cutter bar itself so as to minimize the time and expense of replacing damaged sickle sections.

Another object of the instant invention is the provision of a hand tool of the type described which can be used by a single workman for the cold closing of rivet heads by the application of pressure thereto so that sickle sections may be readily secured in place on the sickle of a cutter bar by the operator of the machine to which the cutter bar is attached without the assistance of other workmen and while the sickle remains mounted on the cutter bar itself.

A further object of this invention is the provision of a hand tool of the aforesaid character which is simple in construction, easy to operate, and can be carried in a tool box or the like so as to be readily available for use in replacing sickle sections when the need arises.

Still another object of the present invention is the provision of a tool for accomplishing the aforesaid purpose and which not only forms a head on the plain end of a malleable rivet, but which holds together the pieces which are to be united by the rivet so that the pieces will at all times be in proper dispositions with respect to the rivet as the latter is being closed.

In the drawing:

FIGURE 1 is a top plan view of the tool made pursuant to the concepts of the present invention;

FIG. 2 is a side elevational view of the tool in an operative position adjacent to a cutter bar for interconnecting a sickle section to the sickle strip of the cutter bar by closing the plain head of a rivet and illustrating the rivet before the same is closed, parts being broken away and in section to illustrate details of construction;

FIG. 3 is a view similar to FIG. 2 but illustrating the position of the tool after the head of the rivet has been closed;

FIG. 4 is a view of the tool taken along line 4—4 of FIG. 2;

FIG. 5 is a fragmentary, bottom plan view of the tool positioned on a cutter bar for closing the plain head of a rivet; and FIG. 6 is a cross-sectional view of the die forming a part of the tool.

Hand tool 10 includes a C-shaped body 12 having a boss 14, and a dolly 16 spaced from boss 14 as illustrated in FIGS. 2 and 3. A handle 18 is integral with body 12 and extends laterally therefrom so that tool 10 may be hand-held.

Dolly 16 is provided with a flat face or rest 20 having a concave recess 22 therein configured to complementally receive the headed end of a rivet. Rest 20 faces boss 14 and is aligned with internally tapped opening 24 in boss 14 which threadably receives a tubular clamping jaw 26 so that the latter is movable toward and away from rest 20.

A knurled rim 28 is integral with jaw 26 adjacent to the end thereof remote from rest 20 so that jaw 26 may be manually rotated with respect to boss 14. The bore 30 of jaw 26 is large enough to receive the plain end 32 of a rivet 34 having a headed end 36 and a shank 38 between ends 32 and 36 thereof. Also, bore 30 is internally threaded to threadably receive structure in the nature of a bolt 40 for movement longitudinally of jaw 26 when the latter is in an operative position relative to dolly 16.

Bolt 40 is provided with a peening die 42 at the end thereof adjacent to dolly 16 as shown in FIG. 2, and a head 44 provided with wrench-receiving flats 46 at the opposite end thereof. Die 42 is defined by a frusto-conical side surface 48, and a relatively flat, innermost surface 50 as shown in FIG. 2. Surfaces 48 and 50 thus define a frusto-conical recess in bolt 40 which progressively decreases in transverse dimension as surface 50 is approached. Die 42 is adapted for the cold closing of end 32 of a rivet 34 by pressure when the headed end 36 of the rivet is received in recess 22 and as bolt 40 is moved toward rest 20 by means of a wrench coupled with head 44.

Tool 10 is especially adapted for closing the plain ends 32 of rivets 34 which interconnect aligned sickle sections 52 to a sickle strip 54 forming a part of a sickle 56 of a conventional cutter bar 58. A number of guards 60 are secured by bolts 62 to cutter bar 58 and extend in the direction of advancement thereof as shown in FIG. 5. Guards 60 each have a pair of fingers 64 which define a space 66 therebetween, fingers 64 being in abutment as shown in FIG. 5, with identical fingers 64 of an adjacent guard 60. Since each guard 60 is attached by a single bolt 62 to cutter bar 58, fingers 64 prevent rotation of guard 60 about respective bolts 62 during operation of cutter bar 58.

One end of strip 54 is coupled to an actuatable pitman so that, upon actuation of the pitman, strip 54 and thereby sections 52, are reciprocated with respect to guards 60. A crop growing in advance of cutter bar 58 is cut by movements of sections 52 with respect to guards 60.

In use, tool 10 is used to replace a damaged section 52, each section 52 generally being secured by a pair of rivets 34 to strip 54. A chisel is used in the usual manner for removing the rivets of the damaged section 52 so that a new pair of rivets and a new section 52 may be mounted on strip 54. With the old rivets 34 and the damaged section 52 removed, a new rivet 34 is passed through aligned holes in strip 54 and the new section 52. Tool 10 is then moved into position in alignment with a corresponding space 66 and disposed to receive the headed end 36 of the rivet 34 in recess 22. Strip 54 and the new section to be mounted in place will then be disposed in the space between boss 14 and dolly 16 with die 42 in alignment with plain end 32 of the rivet 34 whose headed end 36 is received in recess 22. Jaw 26 is then manipulated for movement toward dolly 16 until the proximal end of jaw 26 engages the adjacent, generally upper face of the section 52 to be secured in place. End 32 of rivet 34 will be received within jaw 26 and thereby within die 42 inasmuch as bolt 40 moves with jaw 26.

End 32 is cold-closed by rotating bolt 40 in a direction to move die 42 toward dolly 16. Rivet 34 is formed of a malleable material so that formation of a head 68 is accomplished by die 42 as the latter moves toward dolly 16. Bolt 40 will continue to advance until die 42 engages the upper face of section 52, at which time head 68 will have been properly formed so that the corresponding rivet 34 effectively interconnects strip 54 and section 52.

Jaw 26 is then backed off from head 68 to permit removal of tool 10 from the operative position thereof shown in FIG. 2. An adjacent rivet 34 is closed in the same manner as described so that section 52 will be rigidly interconnected to strip 54 and the machine with which cutter bar 58 is associated will be ready to resume operations.

It is clear that tool 10 may be used to close the plain ends of a number of rivets 34 without removing sickle 56 from cutter bar 58. The closing of the rivets is accomplished by pressure rather than by peening; therefore, no additional tools other than a wrench for rotating bolt 40 is required in order to accomplish the closing of the rivets. Jaw 26 effectively holds the pieces, i.e., rivet 34, section 52 and strip 54 in proper positions as die 42 forms head 68.

It is clear, therefore, that tool 10 is simple in construction, can be used by workmen with no special skills, and can be made so as to be small enough to be carried in conventional tool boxes. As a result, tool 10 will be available at all times when required and can be used by a single individual so that a machine operator does not need the assistance of other workmen in order to replace damaged sickle sections 52.

Having thus described the invention, what is claimed as new and desired to be secured by Letters Patent is:

1. A hand tool for attaching a knife section of a sickle to its mounting strip while the sickle is in the cutter bar of a harvesting machine through use of a rivet of malleable material having a headed end, a plain end, and a shank passing through aligned holes in the section and the strip, said tool comprising:
    a handle having a C-shaped body at one end thereof, presenting a boss and a dolly,
    the boss and the dolly being spaced apart for receiving the strip and the section therebetween,
    the dolly having a flat rest for receiving the strip,
    said rest facing the boss and having a recess for receiving the headed end of the rivet,
    there being a tapped opening in the boss aligned with the rest;
    a jaw threaded in said opening for movement toward and away from the rest to clamp the section and strip against the rest,
    said jaw having a tapped bore therethrough for clearing the plain end of the rivet when the section and strip are clamped between the jaw and the rest;
    a bolt threaded in the bore and of lesser transverse cross-section than the latter for telescopic movement within the bore toward and away from the rivet; and means on the bolt to facilitate rotation of the latter,
    said bolt having a die end proximal to the rivet for cold closing of the latter by pressure while the section and strip are clamped against the rest upon rotation of the bolt in a direction to move the latter toward said plain end of the rivet.

2. The invention of claim 1, said jaw having a knurled rim at that end thereof remote from the rest.

3. The invention of claim 1, said means to facilitate rotation of the bolt including a head integral with the bolt, said head being provided with wrench engaging flats.

References Cited by the Examiner
UNITED STATES PATENTS

| | | | |
|---|---|---|---|
| 823,356 | 6/1906 | Oslund | 78—46 |
| 1,000,867 | 8/1911 | Widmayer | 59—7 |
| 1,248,355 | 11/1917 | Lyle | 78—6 |
| 1,373,427 | 4/1921 | Houser | 78—46 |
| 1,436,429 | 11/1922 | Bean | 59—7 |
| 2,219,631 | 10/1940 | Milberg | 78—6 |
| 2,590,585 | 3/1952 | Temple | 78—52 |
| 2,826,893 | 3/1958 | Falk | 59—7 |

CHARLES W. LANHAM, *Primary Examiner.*

G. P. CROSBY, *Assistant Examiner.*